United States Patent [19]
Brummette et al.

[11] Patent Number: 5,134,482
[45] Date of Patent: Jul. 28, 1992

[54] ADJUSTABLE VIDEO SHARPNESS CIRCUIT

[75] Inventors: Steven C. Brummette; William G. Miller, both of Knoxville, Tenn.

[73] Assignee: North American Philips Corporation, New York, N.Y.

[21] Appl. No.: 618,346

[22] Filed: Nov. 26, 1990

[51] Int. Cl.⁵ .......................................... H04N 5/208
[52] U.S. Cl. .................................................. 358/166
[58] Field of Search ................... 358/166, 167, 36, 37, 358/174, 162, 160

[56] References Cited

U.S. PATENT DOCUMENTS

| | | | |
|---|---|---|---|
| 3,800,077 | 3/1974 | Smith | 358/166 |
| 4,263,616 | 4/1981 | Lee | 358/166 |
| 4,536,796 | 8/1985 | Harlan | 358/166 |
| 4,573,075 | 2/1986 | Bolger | 358/167 |
| 4,994,915 | 2/1991 | Takahashi et al. | 358/162 |

Primary Examiner—James J. Groody
Assistant Examiner—Glenton B. Burgess
Attorney, Agent, or Firm—Edward W. Goodman

[57] ABSTRACT

A video sharpness circuit comprising a delay circuit and a mixer for mixing an input video signal and the input video signal delayed by the delay circuit to develop an output video signal having improved sharpness. The mixer has a nonlinear gain for sharpening higher amplitude video signals more than lower amplitude video signals, and a circuit for adjusting the nonlinearity of the mixer.

6 Claims, 4 Drawing Sheets

ADJUSTABLE VIDEO SHARPNESS CIRCUIT

BACKGROUND OF THE INVENTION

The present invention relates to video sharpness circuits and more particularly to an adjustable sharpness circuit.

It is known to improve the visual appearance of an image by increasing its apparent sharpness. This is done by decreasing the rise time of amplitude transitions in the video signal representing the image. The amplitude transitions correspond to edges in the video image so that shorter rise times correspond to sharper edges.

The basic sharpness circuit is disclosed in U.S. Pat. No. 2,851,522 issued Sept. 9, 1958 to John M. Hollywood, and in the article by Goldmark and Hollywood, A New Technique For Improving The Sharpness Of Television Pictures, Proceeding of the I.R.E., October, 1951, pgs. 1314 to 1322. This circuit is a nonlinear circuit which adds the video signal and a compensating signal obtained from the derivative of the video signal. The compensating signal has a short rise time so that the sum signal has a shorter rise time than the input video signal. In both of these documents the problem of noise immunity is not addressed.

As digital techniques are applied more frequently in television receivers it will become increasingly necessary to design receiver circuits to take into account signal quantization noise. After a digital video signal has been converted back to an analog video signal, the resulting analog video signal will have a noise component arising from its previous quantization. Circuits, such as sharpness circuits, which will process the analog video signal containing quantization noise will have to be immune to the quantization noise.

Accordingly, it is an object of the invention to provide a video sharpness circuit which performs well with analog video signals containing quantization noise.

It is another object of the invention to provide an adjustable video sharpness circuit which develops an output signal that is dependent on the input signal amplitude in an adjustable non-linear manner.

SUMMARY OF THE INVENTION

According to the invention a video sharpness circuit comprises a delay circuit for receiving and delaying a video signal. A mixer circuit receives the video signal and the delayed video signal and mixes them to develop an output signal. The mixer has an amplitude dependent frequency response for peaking higher amplitude video signals more than lower amplitude video signals. Thus, low amplitude noise is mixed at a lower gain than the video input signal. Means for adjusting the nonlinearity of the mixer circuit provides for the adjustment of the sharpness circuit.

DETAILED DESCRIPTION OF THE INVENTION

Figure 1:
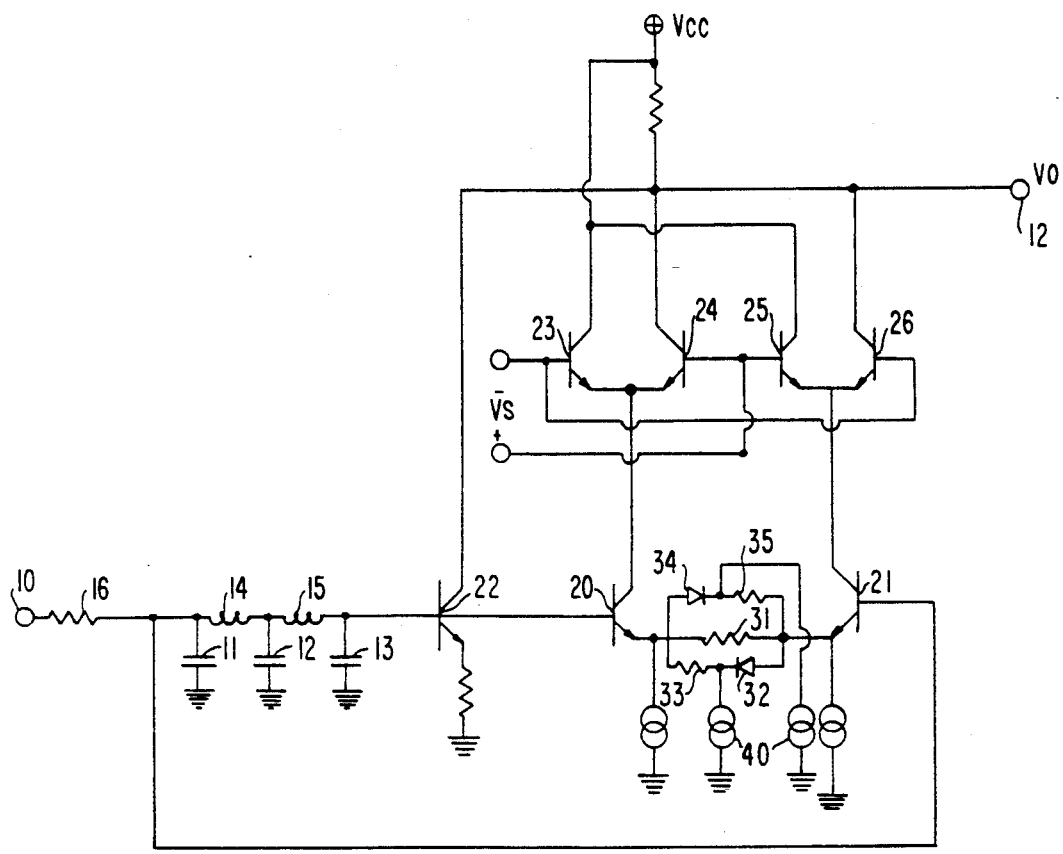
FIG. 1 is a schematic of a video sharpness circuit according to the invention.

The sharpness circuit shown in FIG. 1 has an input 10 for receiving an analog video signal. Capacitors 11-13, inductors 14, 15 and resistor 16 together comprise a filter which functions as a delay line. Ideally the filter has a linear phase response, i.e. it is a Bessel filter, but its phase response may depart from linearity according to the requirements of the system in which the sharpness circuit used. The output of the delay line is applied to the base of the transistor 20. The signal applied to input 10 is applied to the base of the transistor 21 as well as the input of the delay line. Consequently, the signal across the delay line is applied across the respective bases of the transistors 20 and 21. The delay line output signal is also applied to the base of the transistor 22. The collector voltage of the transistor 22, developed at the output terminal 12, constitutes the output of the sharpness circuit.

The transistors 23, 24, 25 and 26 comprise a circuit for mixing the collector currents of the transistors 20 and 21,. and summing them with the collector current of transistor 22. The summing of the collector current of transistor 20 with that of transistor 22 imparts a frequency selective or peaking characteristic to the frequency response of the sharpness circuit. Conversely, the summing of the collector current of the transistor 21 with that of transistor 22 results in attenuation of the peaking characteristic. The control voltage applied to the bases of the transistor 23-26 controls the current mixture and constitutes a sharpness control signal.

The mixer circuit comprised of transistors 20, 21 and 23-26 is commercially available as an integrated circuit. For example, Signetics type MC1496/MC1596 balanced modulator/demodulator integrated circuits are usable as a mixer in the sharpness circuit according to the invention.

It has been found that nonlinear peaking can be used to avoid degradation of the signal-to-noise ratio of the input video signal. To this end, the circuit between the respective emitters of transistors 20 and 21 is a nonlinear network. The nodes at the respective emitters of transistors 20 and 21 are accessible through external contact pins of the MC1496 integrated circuit, and the nonlinear network can be connected between them.

In the embodiment shown in FIG. 1 the nonlinear network is comprised of three branches. The first branch is comprised of resistor 31 and is purely resistive. The second and third branches are both in parallel with the resistor 31. The second and third branches each include a nonlinear circuit element, and in a preferred embodiment these are Schottky diodes. The second branch of the nonlinear network is comprised of diode 32 and resistor 33 connected in series with the diode 32. Similarly, the third branch of the nonlinear network is comprised of diode 34 and resistor 35 in series. The two diodes 32 and 34 are connected with opposite relative polarity.

The current source 40 is used for controlling the nonlinearity of the circuit independently of the sharpness circuit input signal Vs. The circuit branches containing the diodes 32 and 34 are identical so that the nonlinear characteristic of the sharpness circuit does not change with polarity changes of the input signal. The current source 40 similarly applies an identical current to each of the second and third branches of the nonlinear network to maintain the symmetry of the sharpness circuit characteristics relative to the input signal.

Because the diodes 32 and 34 have nonlinear voltage-current characteristics, the value of the current through the diodes determines the impedance of each circuit branch. The value of the current from the current source 40 can consequently be used to adjust the nonlinear characteristics of the sharpness circuit.

Figure 2:
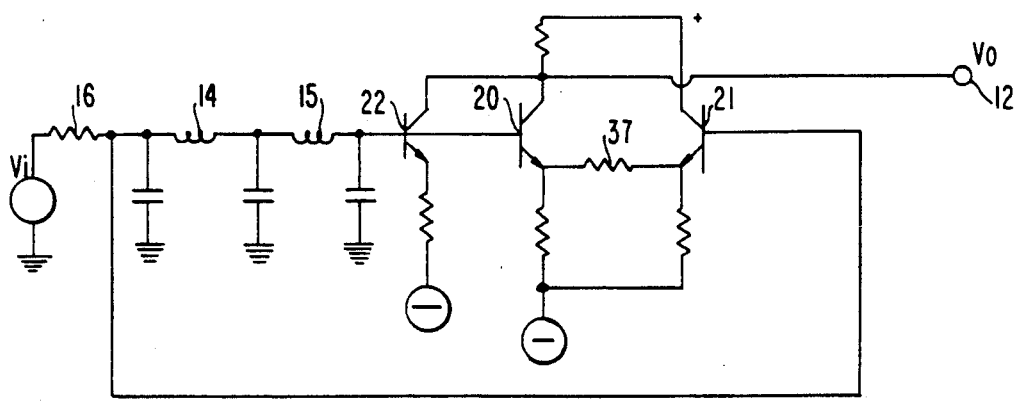
FIG. 2 is a simplified schematic of the circuit shown in FIG. 1.

The operation of the sharpness circuit can easily be appreciated by reference to FIG. 2. The illustrated circuit is the equivalent of FIG. 1 under the condition that a sufficiently high control voltage Vs has been applied to completely turn off the transistors 23 and 26. This is the condition of maximum peaking. The circuit element 39 represents the impedance of the nonlinear network. The bias of the transistors 20 and 21 and hence their gain is dependant upon the base input voltages, because of the nonlinear characteristic of the network impedance 39 between the respective emitters of the transistors 20 and 21. The greater the input voltage the greater the peaking in the sharpness circuit frequency response.

Figure 3:
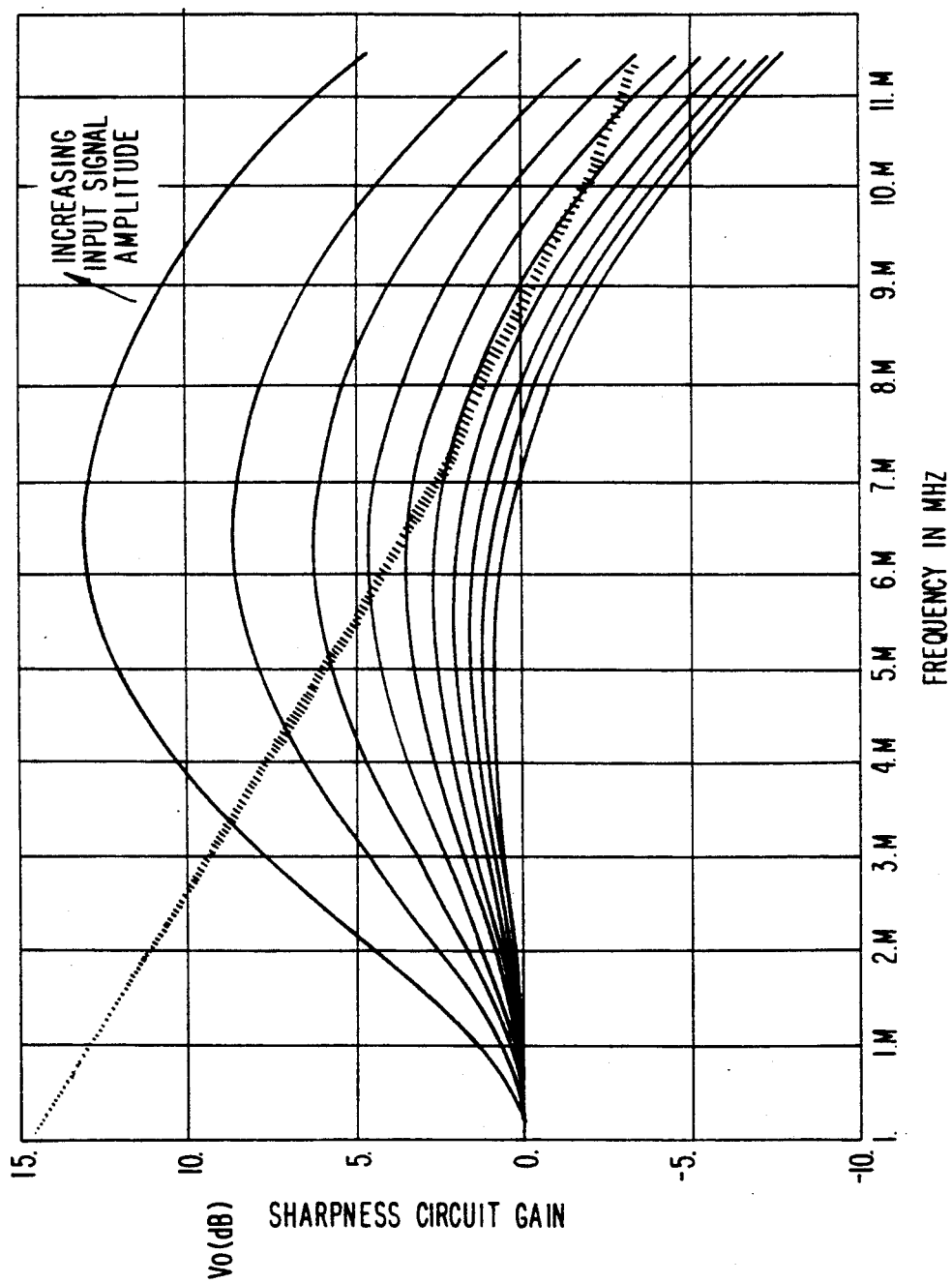
FIG. 3 illustrates the amplitude dependence of the frequency response of the sharpness circuit according to the invention.

FIG. 3 illustrates the frequency response of the sharpness circuit as a function of input signal amplitude. The circuit frequency response is represented by a family of curves each corresponding to a different value of input signal amplitude. At low input amplitudes almost no peaking occurs and the sharpness circuit frequency response is substantially that of a low pass filter. At progressively higher input amplitudes the peaking becomes more pronounced and the sharpness circuit characteristic becomes more like that of a pass band filter with gain.

The family of response characteristics represented by the curves in FIG. 3 can be adjusted by the peaking adjusting current from the current source 40. By increasing the current to a sufficient value each of the diodes 32 and 34 in the two circuit branches will exhibit a very low substantially constant impedance and the degree of peaking in the sharpness circuit frequency response will be independent of the sharpness circuit input signal amplitude. By decreasing the current from the current source 40 a family of characteristics like that in FIG. 3 will be observed. The lower the current from the source 40, the greater the input which will be required to cause the sharpness circuit to exhibit appreciable peaking.

Figure 4:
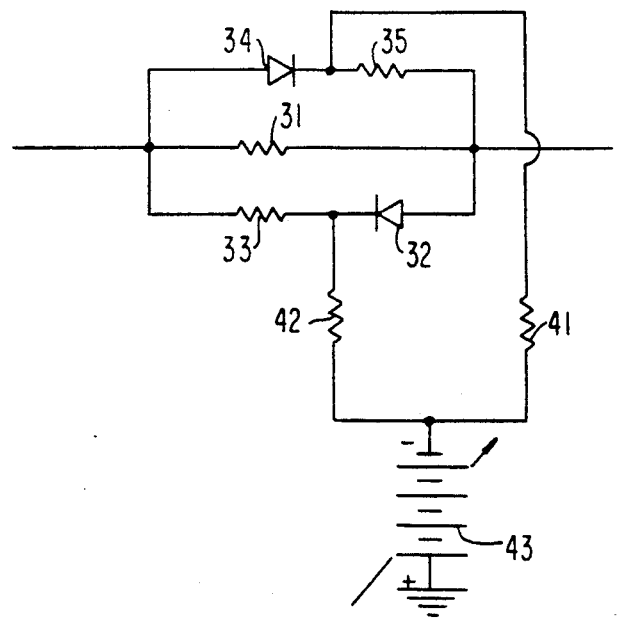
FIGS. 4-6 illustrate other embodiments of the sharpness circuit according to the invention.

FIG. 4 illustrates an embodiment of the invention in which the peaking adjusting current through the branches of nonlinear network can be set by the user of the circuit. The resistors 41, 42 are connected between the respective network branches and a variable voltage source 43. The resistors 41 and 42 have identical values. The variable voltage source 43 may be of any convenient design, and may be manually set, or it may be controlled by some electrical signal within the system.

Figure 5:
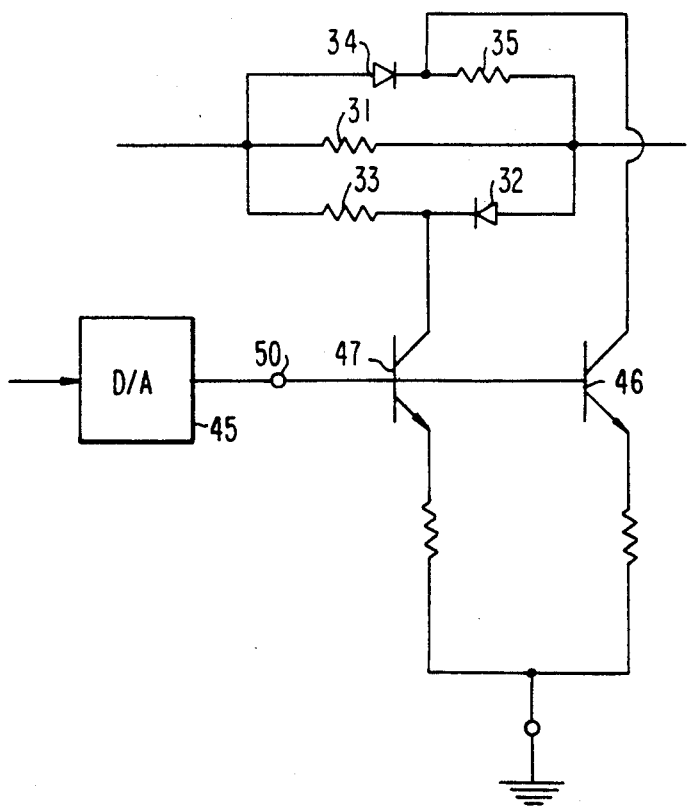

FIG. 5 illustrates an embodiment of the sharpness circuit controllable by a digital signal. The circuit branches of the nonlinear network containing the diodes 32 and 34 each having a peaking adjusting current which flows through a respective one of the transistors 46 and 47. The respective bases of transistor 46 and transistor 47 are connected to control signal input terminal 50. The digital-to-analog (D/A) converter 45 receives a digital control signal and converts it to an analog control signal which is applied to the terminal 50. The control signal can be varied to change the respective current through each transistor 46 and 47 so as to set the peaking adjusting current through the diodes 32 and 34.

Figure 6:
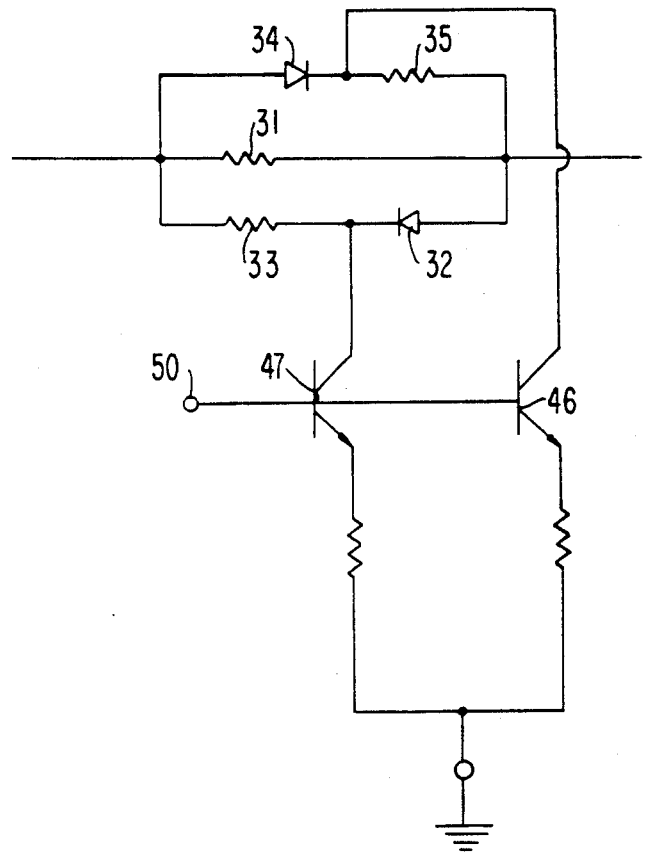

The embodiment shown in FIG. 6 is identical to that shown in FIG. 5, except the D/A converter is omitted. AN analog control signal applied to the terminal 50 is effective to control the peaking adjusting current and the nonlinear peaking characteristic of the sharpness circuit.

One particular application of the present invention is to be found in digital television receivers. A digital video signal, converted to an analog video signal, will contain low amplitude quantization noise. The sharpness circuit according to the invention will not enhance the quantization noise because of its low amplitude, but it will improve the sharpness of the video image represented by the signal. Consequently, the sharpness of the video image can be improved without degradation of the signal-to-noise ratio of the video signal.

What is claimed is:

1. In a video sharpness circuit having a delay circuit for receiving an input video signal and for delaying the same, and a mixer circuit for mixing the input video signal and the delayed input video signal to develop an output video signal having improved sharpness, the improvement comprising:

said mixer circuit having a nonlinear gain for sharpening higher amplitude input video signals more than lower amplitude input video signals, said mixer circuit comprising a pair of transistors, and means for biasing said pair of transistors in an amplification mode, said means for biasing including a nonlinear circuit element coupling the respective emitters of said pair of transistors for imparting said nonlinear gain to said mixer circuit, said nonlinear circuit element being nonlinear with respect to amplitude; and means for adjusting the nonlinearity of said mixer circuit.

2. In a video sharpness circuit according to claim 1 said means for adjusting the nonlinearity of said mixer circuit comprising means for adjusting a current through said nonlinear circuit element to adjust the impedance of said nonlinear circuit element.

3. In a video sharpness circuit according to claim 1 said means for biasing comprising three parallel circuit branches including a first resistive branch, a second branch having a unidirectional nonlinear circuit element, and a third branch having a unidirectional nonlinear circuit element opposite in polarity to that of said second branch.

4. In a video sharpness circuit according to claim 3 said means for adjusting the nonlinearity of said mixer circuit comprising means for adjusting respective currents through said unidirectional nonlinear circuit elements to adjust the impedance of said nonlinear circuit elements.

5. In a video sharpness circuit according to claim 2, wherein said delay circuit is a filter circuit.

6. In a video sharpness circuit according to claim 5, wherein said filter circuit has a substantially linear phase response.

* * * * *